Aug. 12, 1969     L. A. FOLLANSBEE     3,460,514
APPARATUS FOR PROVIDING A CONTROLLED ENVIRONMENTAL
HABITAT FOR AQUATIC ORGANISMS
Filed Feb. 21, 1967

LEWIS A. FOLLANSBEE
INVENTOR

Huebner & Worrel
ATTORNEYS

United States Patent Office 3,460,514
Patented Aug. 12, 1969

3,460,514
APPARATUS FOR PROVIDING A CONTROLLED ENVIRONMENTAL HABITAT FOR AQUATIC ORGANISMS
Lewis A. Follansbee, 122 E. Bay Ave., Balboa, Calif. 92661
Filed Feb. 21, 1967, Ser. No. 617,653
Int. Cl. A01k 64/00, 67/00
U.S. Cl. 119—5                                6 Claims

ABSTRACT OF THE DISCLOSURE

Apparatus for promoting life and growth of aquatic organisms by placing the organisms in a body of water of controlled environment, with growth food therein, and maintaining a growth environment substantially free from substances deleterious to aquatic organism life.

---

Figure 1:
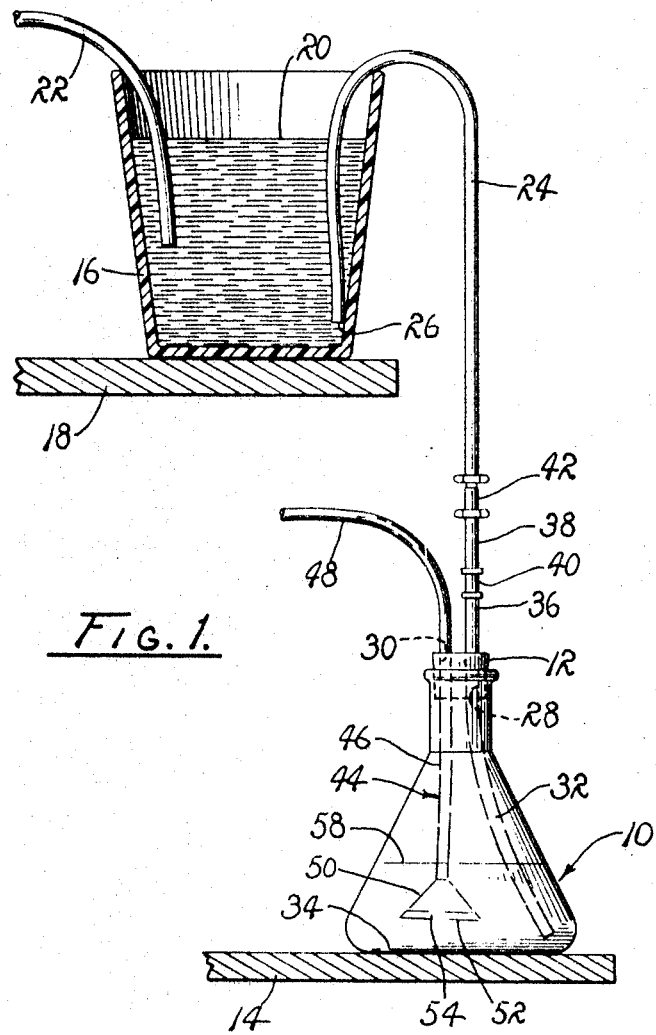

More specifically the present invention resides in apparatus and a method for growing aquatic organisms, and particularly promoting life and growth of aquatic organisms under controlled or partially controlled environmental conditions in order to promote the production of proteinaceous foods for human consumption, and to eliminate to a substantial extent early life fatalities among such organisms due to such causes as disease, devourment by aquatic environment inhabitants, pollution, contamination, inadequate or uncontrollable water supply in tidelands or the like, and other causes existing in natural environments.

While the world population is increasing substantially each year, in some instances there has been an actual decrease in food production due to various causes including weather conditions, migration of farm personnel away from farm lands, poor crops, political interference, and other factors beyond farmer control. In any event, the world food supply has not been keeping pace with the accelerated population increase.

It is also known that in many areas where malnutrition and hunger are the greatest, there has been significant and serious reductions in food production. Substantial numbers of persons in many countries are inadequately nourished under present practices relating to food production. If present tendencies continue, the areas of current food deficiency will inevitably be confronted with seriously aggravated shortages and areas of present adequate food supply will become critically deficient. The greatest deficiency is known to be in the supply of proteins. Many aquatic organisms are known to be rich in proteins. For a substantial period of time, thought has been given to scientific growth and harvesting of aquatic organisms including so called "farming of the sea" in an attempt to alleviate the lack of food, although little has actually been accomplished to this end, and as a matter of fact relatively little attention has been given to increasing the productivity and efficiency of harvesting aquatic organism food in the various available environments.

It is now known that in addition to antiquated methods of harvesting aquatic food, and the unfortunate apathy toward increased research in this area, a very substantial diminution of available food results from early fatality of aquatic organisms including, for example but not limited thereto, algae, invertebrates and fishes.

The primary purpose of the present invention is to eliminate, at least in part, this last mentioned cause of reduced availability of aquatic organisms as a source of food, and to forestall and even possibly to overcome the world extant need for an increased and continuing source of a readily available food supply.

In accordance with the present invention, apparatus and a method are provided for growing aquatic organisms particularly during the early period of their lives, under controlled or partially controlled environmental conditions, in an attempt to overcome early life fatality, and accordingly to increase aquatic organism and marine life as available sources of food supply.

An additional aspect of the invention resides in a continued control of growth environment subsequent to the very early stages of aquatic organisms life to a point where the aquatic organisms are more self-sufficient and not as susceptible to death and diminution.

Another object is to provide apparatus and a method in the nature of laboratory controlled growth of aquatic organisms to an age of improved self-reliance and a longer anticipated life expectancy.

Other and additional objects of the present invention will be more readily apparent from the following detailed description of the invention when taken together with the accompanying drawing disclosing a form of apparatus effective in pursuing the objects of the invention.

Figure 3:
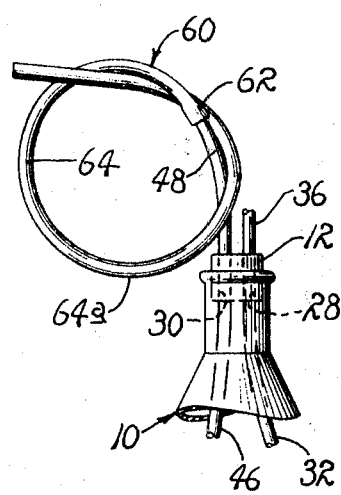
Figure 2:
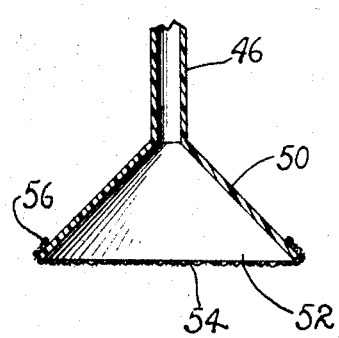

In the drawing:
FIG. 1 is a schematic drawing of apparatus for practicing the invention;
FIG. 2 is an enlarged fragmentary view of an element useful in the present apparatus to retain organisms in a controlled environment while permitting water flow therethrough and to facilitate maintaining a substantially uncontaminated aquatic environment for enhancing aquatic organism growth; and
FIG. 3 is a schematic drawing of apparatus to eliminate entry of airborne contaminants into the aquatic environment.

While it is appreciated that much more must be known about aquatic organism nutrition, growth, reproduction, behavior, and general ecology, I have found that by utilizing the teachings of my invention I am able to, in a rewarding manner, solve some of the practical problems of managing and controlling aquatic populations under artificially controlled environments, and enhance the growth and maximum potential use of a wide variety of aquatic organisms.

In practicing this invention a reservoir, container or aquarium, generally designated 10 is used, and which can be of any desired shape or size, but preferably susceptible of being closed from the atmosphere by a closure member 12, with provision being made for access into the container of certain apparatus to be later described and additionally this apparatus serves to introduce organisms, food, etc. into the container. In a laboratory-type controlled environment a plurality of such containers 10 are arrayed side-by-side on a common support so as to be readily accessible for attention by a technician or attendant, and in such multiplicity is in the nature of a farm for growth of aquatic organisms.

A container 16 for a controlled constituent water, such as for example clarified water, of any desired shape and size, is provided and can be supported by any means, such as generally indicated at 18. The water indicated at 20, is preferably continuously supplied to the container 16 by means of a tube 22 of predetermined size. The flow of water through the tube 22 is regulated by any suitable means, not shown, in such relation to an outlet feed tube 24, that a substantially continuous pre-calculated depth of water 20 is maintained in the container. This permits controlled flow thereof into the containers 10 in which the aquatic organisms are to be grown under artificial or semi-controlled conditions. The intake end 26 of tube 24 extends in proximity to the bottom of container 16 to take advantage of well-known siphoning principles for controlled feed from the source 20.

The closure member 12 is provided with two bores 28 and 30 extending therethrough. An inlet tube 32 is inserted through the bore 28 with the lower end extending in proximity to the bottom 34 of the container 10, with the upper end 36 extending outside of the container above the closure member 12. A connector tube 38 interconnects the lower end of tube 24 with the extended end 36 of tube 32. A detachable connector, generally designated at 40, interconnects one end of connector tube 38 with the end 36 of tube 32. A flow control valve of any desired type, generally designated 42, connects the opposite end of connector tube 38 with the lower end of tube 24. By manipulating valve 42 the inlet rate of flow of the water 20 from the container 16 into container 10 can be effected.

A fluid outlet, generally designated 44, includes a tubular portion 46 which extends through bore 30 in closure member 12 to the exterior of container 10, as shown at 48. The other end of the fluid outlet 44 has an enlarged filter or screen holding portion 50, and, as shown in the drawing, is preferably generally conical in order to provide an enlarged mouth portion 52. A filter or screen extends over mouth portion 52 and is secured thereover by any appropriate means, generally designated 56. This filter or screen, as shown in the drawing, is disposed in proximity to the bottom 34 of container 10. By adjusting the relative height of inlet tube 32 with respect to that of fluid outlet member 44, in conjunction with adjustment of flow-through valve 42, a substantially constant level 58 can be maintained in container 10. By appropriate dimensioning and spacing of the containers with respect to one another, and by proper sizing of the tubes and adjustment of the valve, and positions of the tubes extending into container 10, a constant predetermined rate of flow of water 20 can be provided for container 10.

In FIG. 3 an additional feature of the invention is shown, which resides in means operable to exclude airborne contaminants from entering the reservoir containing the organisms. Reference numerals used in this embodiment are similar to those in the prior embodiment where applicable. Additionally, however, a tube extension 60 is attached at 62 to the outer end 48 of tube 46, and the tube extension is then provided with a loop, indicated at 64, including a lower extremity 64a. This arrangement or configuration of the tube extension creates a water trap in the lower portion 64a of the loop, and prevents airborne contaminants from passing through the outlet conduit into container 10 and further insures that the growth environment in the liquid container is maintained free of contaminants.

Water contemplated for use in practicing the invention preferably is of a nature having selected or predetermined characteristics. The water can, for example have impurities such as dirt, contamination and infestation removed therefrom as well as aquatic life harmful to aquatic organisms which it is desired to cultivate, but natural and/or artificial food is contained therein of a nature required by aquatic organisms present in the container 10 to subsist and to grow. The temperature of water inserted into container 10 is controlled dependent upon the nature, characteristics and habits of aquatic organisms which it is desired to raise in the container 10. The atmospheric temperature around container 10 can also be controlled as desirable. The opening size through a screen or filter 54 is so-selected as to permit passage of water from container 10 under the controlled conditions as set forth above, together with excrement from the aquatic organisms housed in the container, while at the same time preventing passage therethrough of the aquatic organisms per se. Screen for example, having mesh sizes of from ten per inch to one thousand per inch have been satisfactorily employed, depending upon the particular organisms involved. Even filter paper, ceramics, charcoal, and the like having the necessary structure may be utilized, if desired. The environmental condition for aquatic organisms in the container 10 is therefore maintained in a desired controlled condition having preselected characteristics, while an appropriate source of food is continuously or periodically supplied in sufficient quantity to the organisms.

The materials used in fabrication of the above described apparatus consist of any appropriate material, but preferably the container 10 is transparent and of a material easily susceptible of cleaning for maintaining a sanitary condition. The various tubes, closure member, connector, valve, etc. are likewise preferably constructed of a material such as suitable plastic or glass which can readily be cleaned and maintained in a sanitary condition.

In practicing the method of the present invention a selected quantity of water containing aquatic organisms is placed in the container 10, which is thereafter closed by means of the closure member 12 with the tubes arranged as shown in the drawing and above described. Control of the flow of water 20 is then appropriately regulated at a very slow flow rate, adequate to provide a continuing, periodic or aperiodic flow sufficient to maintain desired environmental conditions and to flush contaminants, such as excrement from the container. Because of the closed system provided, regulation of fluid supply automatically regulates fluid exhaust with the water level in the closed container remaining substantially constant. Food for the organisms can be supplied continuously, periodically or aperiodically with the flow of water while exhausting contaminated or dirty water from the container. If desired, water flowing from the tube 48 can be recirculated, with appropriate measures being taken to filter or clarify the same, and insuring an adequate food supply level therein to promote growth of the organisms. Temperature conditions of the water and container are also appropriately established and regulated.

It has been found that aquatic organisms grow very favorably when utilizing teachings of the present method, especially during the early stages of organism life. A very favorable or "tailor made" life and growth environment is established in accordance with the invention and the organisms can grow in a disease-free food providing liquid. If desired, antibiotics, bactericides, and bacteriostats can be appropriately incorporated in the fluid for additional safety. The present invention is also capable of use for high standard genetic studies pertaining to aquatic organisms. In actual practice, the antiseptic and growth stimulating environment provided by the apparatus and method of the present invention have reduced the mortality rate for infant shrimps, crabs, lobsters and other crustaceans to a small fraction, in some instances to less than one thousandth, of that normally expected even under the best laboratory conditions previously available, while permitting large scale production with a minimum of labor. Results suggest one millionth to be within the realm of practicality.

The aquatic organisms can be grown to a desired size within an appropriate period of time and thereafter be released in open bodies of water with a much greater chance for continued life and growth, resulting from the artificially controlled or semi-controlled early life growth and environment. If desired, controlled areas of open waters can be used for a further period of semi-controlled life and growth environment, such as by use of cofferdams or the like in tide areas. Substantially larger artificial enclosures containing controlled water can also be established as a supplemental growth area, provided that necessary precautions are taken to maintain the water free of contamination or pollution and insuring a proper continuing source of food material for organisms therein.

Although the invention has been herein shown and described in what is conceived to be the most practical and preferred method and apparatus, it is recognized that departures may be made therefrom within the scope of the invention.

Having described my invention, what I claim as new and desire to secure by Letters Patent is:

1. An apparatus for growing aquatic organisms comprising a reservoir closed to the atmosphere containing a body of water and an entrapped mass of air, the water being adapted to contain the aquatic organisms, a supply conduit having an inner end open to the reservoir and an outer end exteriorly of the reservoir, an outlet conduit having an inner end disposed in the body of water in the reservoir and an outer end exteriorly of the reservoir, means connected to the supply conduit for supplying replacement water containing food and other aquatic organism treating material to the reservoir at a controlled rate against the cushion of entrapped air whereby water is displaced from the reservoir through the outlet conduit at a corresponding rate, and perforate means on the inner end of the outlet conduit forming a barrier to said aquatic organisms to retain them in the reservoir while admitting contaminated water, organism excrement and the like into the outlet conduit.

2. The apparatus of claim 1 in which the outer end of the outlet conduit is above the water level in the reservoir, and the outlet conduit externally of the reservoir has a depressed portion lower than portions of the conduit on opposite sides thereof to form a liquid trap operable for trapping and excluding airborne contaminants from passage through the outlet conduit into the reservoir.

3. An apparatus for growing aquatic organisms adapted automatically to maintain a substantially constant water level therein as water is added thereto comprising a reservoir closed from the atmosphere containing a body of water an entrapped mass of air, a supply conduit having an inner end within the reservoir and an outer and exteriorly of the reservoir adapted to have water supplied thereto under sufficient pressure to enter the reservoir, a continuously open outlet conduit having an inner end disposed in the body of water in the reservoir and an outer end exteriorly of the reservoir open to the atmosphere, and perforate means on the inner end of the outlet conduit forming a barrier to such aquatic organisms to retain them in the reservoir.

4. The apparatus of claim 3 in which the outer end of the outlet conduit is above the water level in the reservoir to maintain a positive pressure therein.

5. The apparatus of claim 4 in which the outlet conduit has a loop therein forming a trap which when filled with water isolates the reservoir from the atmosphere.

6. The apparatus of claim 4 in which a container open to the atmosphere adapted to receive water and aquatic organism treating material is connected to the outer end of the supply conduit supported at an elevation above the reservoir gravitationally to supply said pressure.

References Cited

UNITED STATES PATENTS

| | | | |
|---|---|---|---|
| 3,198,171 | 8/1965 | Westphal | 119—5 X |
| 2,944,513 | 7/1960 | Keely | 119—3 |
| 3,113,555 | 12/1963 | Overman | 119—3 X |
| 3,116,712 | 1/1964 | Ogden et al. | 119—5 X |
| 3,158,135 | 11/1964 | Kimmerle | 119—3 |
| 3,255,731 | 6/1966 | Girard | 119—3 |
| 3,288,110 | 11/1966 | Goldman et al. | 119—5 |
| 3,303,819 | 2/1967 | Wade | 119—5 |
| 3,306,256 | 2/1967 | Lewis | 119—5 |
| 3,321,081 | 5/1967 | Willinger | 119—5 X |

ALDRICH F. MEDBERY, Primary Examiner

U.S. Cl. X.R.

119—1